United States Patent
Reynolds et al.

(10) Patent No.: US 9,313,535 B2
(45) Date of Patent: Apr. 12, 2016

(54) GENERATING MONTAGES OF VIDEO SEGMENTS RESPONSIVE TO VIEWING PREFERENCES ASSOCIATED WITH A VIDEO TERMINAL

(75) Inventors: Jennifer Reynolds, Johns Creek, GA (US); Charles Dasher, Lawrenceville, GA (US); Paul Canter, Gainesville, GA (US)

(73) Assignee: ERICSSON AB, Stockholm (SE)

( * ) Notice: Subject to any disclaimer, the term of this patent is extended or adjusted under 35 U.S.C. 154(b) by 1073 days.

(21) Appl. No.: 13/020,073

(22) Filed: Feb. 3, 2011

(65) Prior Publication Data

US 2012/0201519 A1    Aug. 9, 2012

(51) Int. Cl.
| | |
|---|---|
| *H04N 5/93* | (2006.01) |
| *H04N 21/258* | (2011.01) |
| *H04N 21/472* | (2011.01) |
| *H04N 21/8405* | (2011.01) |
| *H04N 21/845* | (2011.01) |
| *H04N 21/854* | (2011.01) |

(52) U.S. Cl.
CPC ... *H04N 21/25891* (2013.01); *H04N 21/47202* (2013.01); *H04N 21/8405* (2013.01); *H04N 21/8456* (2013.01); *H04N 21/854* (2013.01)

(58) Field of Classification Search
CPC .................. H04N 21/25891; H04N 21/47202; H04N 21/854; H04N 21/8456; H04N 21/8405
USPC .................. 386/281, 278, 290, 323, 343, 353
See application file for complete search history.

(56) References Cited

U.S. PATENT DOCUMENTS

| | | | |
|---|---|---|---|
| 2007/0044010 A1 | 2/2007 | Sull et al. | |
| 2010/0011392 A1* | 1/2010 | Bronstein et al. | 725/28 |
| 2010/0122286 A1* | 5/2010 | Begeja et al. | 725/34 |
| 2010/0262618 A1 | 10/2010 | Hedinsson et al. | |

* cited by examiner

*Primary Examiner* — Robert Chevalier

(57) ABSTRACT

Methods, video terminals, and systems are disclosed for generating a montage of video segments for display by a video terminal. At least one video viewing preference associated with the video terminal is identified. Metadata associated with video segments in at least one video file is searched to identify video segments that correspond to the identified at least one video viewing preference. A montage of the identified video segments is generated for display by the video terminal.

15 Claims, 10 Drawing Sheets

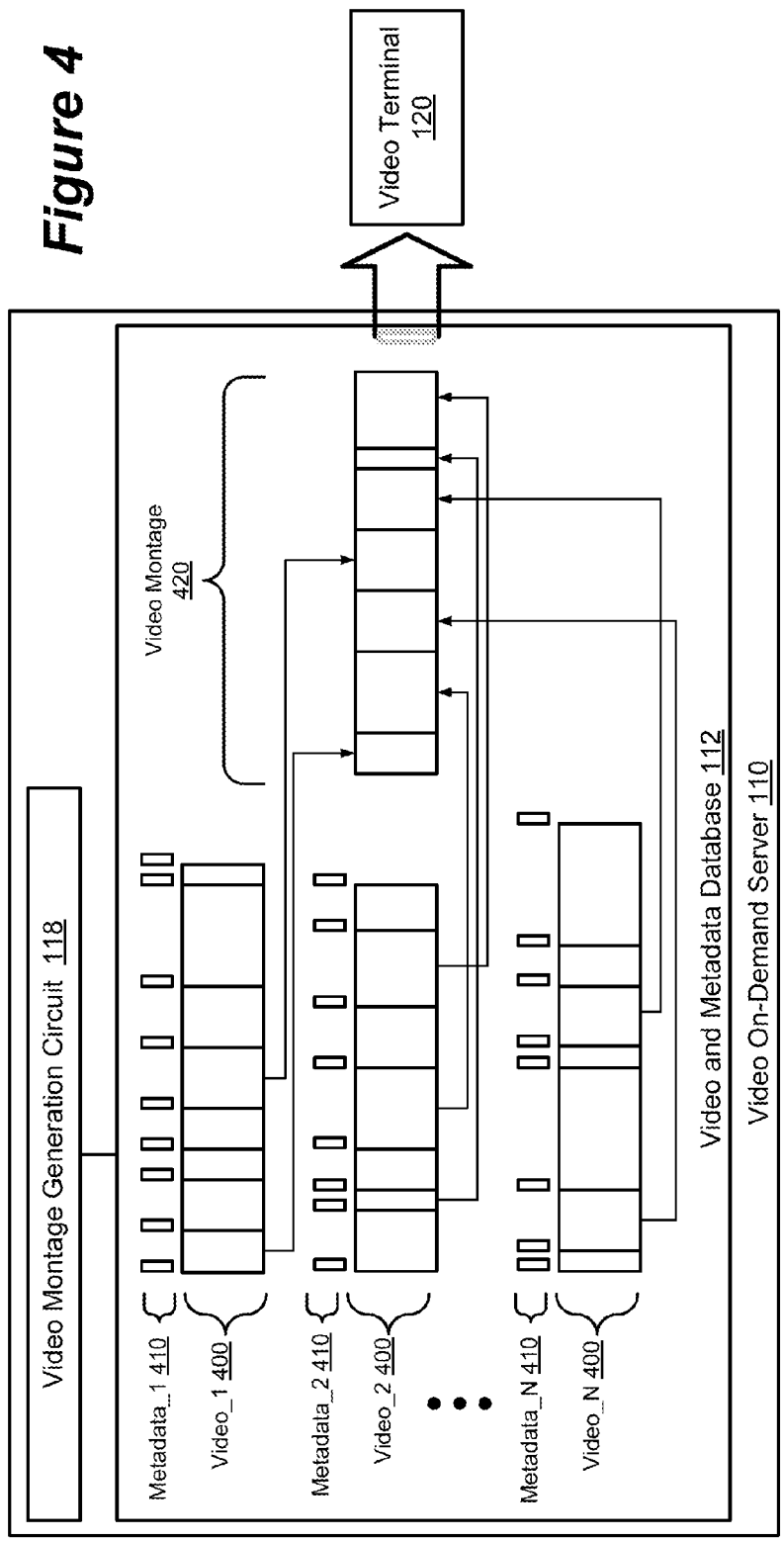

GENERATING MONTAGES OF VIDEO SEGMENTS RESPONSIVE TO VIEWING PREFERENCES ASSOCIATED WITH A VIDEO TERMINAL

TECHNICAL FIELD

The present disclosure relates to the generation of montages of video segments for display by a video terminal.

BACKGROUND

Montage generation is a technique in film editing in which a series of video segments are combined into a sequence to condense time, space, and information. Cable television and satellite television providers use this technique to promote and advertise pay-per-view movies, sports games, or other premium television program services on dedicated channels called Barker channels. A customer can tune to a particular Barker channel to view a sequence of video scenes from movies, sports games, or other premium services that a television provider has selected to advertise on that channel. The television provider may add metadata to the video segments that describes the program to a customer and informs the customer as to when and how the advertised program can be obtained.

The montage that is provided on a Barker channel is manually generated by a technician who reviews each of the programs that are to be advertised, selects scenes that the technician believes will best promote each of the programs, and then strings together the video for the selected scenes within each of the programs to generate a montage that is played on the Barker channel. The particular scenes that are selected for use in the montage depend upon the technician's expertise and knowledge of the targeted market segment of customers and further depend upon meeting other objective criteria, such as ratings/content limits and time constraints on program previews. This approach is inherently limited by the technician's preferences and expertise at predicting what an average customer within the targeted market segment will find most appealing in each of the advertised programs.

SUMMARY

Some embodiments of the present invention are directed to a computer-implemented method for generating a montage of video segments for display by a video terminal. At least one video viewing preference associated with the video terminal is identified. Metadata associated with video segments in at least one video file is searched to identify video segments that correspond to the identified at least one video viewing preference. A montage of the identified video segments is generated for display by the video terminal.

In some further embodiments, the at least one video viewing preference can be identified by receiving at least one user generated search term that characterizes at least one content category that is desired to be seen in video scenes. The metadata can include labels that categorize visual content of at least some scenes contained in the video segments. Searching can be carried out among the labels in the metadata to identify labels that match the at least one content category characterized by the at least one user generated search term. A list can then be generated for the video segments that correspond to the identified labels in the metadata. The montage of identified video segments can then be generated by sequentially playing each of the listed video segments.

In some further embodiments, identification of the at least one video viewing preference can include accessing a database of user data that defines viewing preferences of a user to identify at least one video content category that is preferred by the user. The metadata can include labels that categorize visual content of at least some scenes contained in the video segments. Identification of the at least one video viewing preference can include accessing a database of user data that defines viewing preferences of a user to identify at least one video content category that is preferred by the user. Searching can be carried out among the labels in the metadata to identify labels that match the at least one video content category that is preferred by the user. A list can then be generated for the video segments that correspond to the identified labels in the metadata. The montage of identified video segments can then be generated by sequentially playing each of the listed video segments.

In some further embodiments, the step of identifying at least one video viewing preference can include tracking what segments of what video files a user has viewed and further tracking how often each of the video segments has been viewed to generate user viewing habit data. The step of searching metadata associated with video segments in at least one video file can include matching entries in the metadata to the user viewing habit data to identify the associated video segments.

Some other embodiments are directed to a video montage generation circuit that includes a user preference module, a metadata search module, and a montage assembly module. The user preference module identifies at least one video viewing preference associated with a video terminal. The metadata search module searches metadata associated with video segments in at least one video file to identify video segments that correspond to the identified at least one video viewing preference. The montage assembly module generates a montage of the identified video segments for display by the video terminal.

Some other embodiments are directed to a video on-demand server that includes a user preference module, a metadata search module, and a montage assembly module. The user preference module is configured to identify at least one video viewing preference associated with a video terminal. The metadata search module is configured to search metadata associated with video segments in at least one video file to identify video segments that correspond to the identified at least one video viewing preference. The montage assembly module is configured to generate a montage of the identified video segments for communication through a network to the video terminal.

Some other embodiments are directed to a video terminal that includes a user preference module, a metadata search module, and a montage assembly module. The user preference module is configured to identify at least one video viewing preference associated with a user. The metadata search module is configured to search metadata associated with video segments in at least one video file to identify video segments that correspond to the identified at least one video viewing preference. The video segment montage assembly module is configured to generate a montage of the identified video segments for display on a display device associated with the video terminal.

Other methods, video terminals, and/or systems according to embodiments of the invention will be or become apparent to one with skill in the art upon review of the following drawings and detailed description. It is intended that all such additional methods, video terminals, and/or systems be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings are included to provide a further understanding of various embodiments of the present invention and are incorporated in and constitute a part of this application. In the drawings:

FIG. 4 is another example block diagram of the video on-demand server shown in FIG. 1 that generates a montage of video segments from a plurality of video files;

FIG. 6 is another example block diagram of the video on-demand server shown in FIG. 1;

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Various embodiments of the present invention are directed to configuring video terminals and/or video on-demand servers to generate a montage of video segments for display by a video terminal. The montage can be generated in an automated manner and customized for the particular interests of a person. In some embodiments, the montage is generated in response to at least one video viewing preference identified as associated with the video terminal. Metadata that is associated with video segments in one or more video files is searched to identify video segments that correspond to the identified at least one video viewing preference. A montage of the identified video segments is then generated for display by the video terminal.

Although some embodiments are described in the context of a video terminal that receives a montage of video segments that is generated by a separate video on-demand server, the invention is not limited thereto. The montage may alternatively or additionally be generated by the video terminal. Accordingly, as used herein, a "video terminal" can be any electronic device that is configured to display video on a display device that may be part of the video terminal and/or may be separate but communicatively connected thereto. A video terminal may therefore receive the montage from another device or may generate the montage using internal circuit components. A video terminal may include, but is not limited to, a television/display device, a television tuner (e.g., cable/satellite tuner, such as a set-top-box) that is separate from a television/display device, a wireless communication terminal (e.g., cell phone, local area network terminal, etc.), and/or a desktop/laptop/palmtop/tablet computer.

Figure 1:
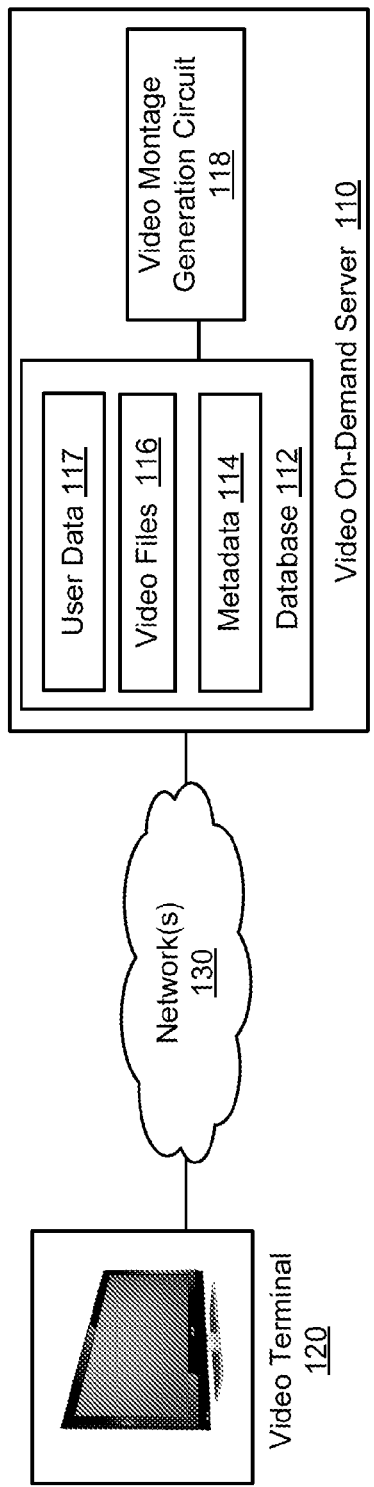
FIG. 1 is an example block diagram of a system that includes a video on-demand server that generates a montage of video segments in response to a video viewing preference identified for a video terminal.

FIG. 1 is an example block diagram of a system that includes a video on-demand server 110 that generates a montage of video segments in response to a video viewing preference identified for a video terminal 120. The server 110 may include, but is not limited to, a cable video on-demand server, a terrestrial broadcast video on-demand server, an Internet video on-demand server, and/or a satellite broadcast video on-demand server. The server 110 communicates the montage through a network 130 to the video terminal 120. The network 130 may be any public/private broadband data network(s) and may include a radio access network, such as a cellular radio network and/or a wireless local area network.

The server 110 includes a database 112 and a video montage generation circuit 118. The database 112 contains video files 116 and metadata 114 that identifies characteristics of video segments in the video files 116. Although the metadata 114 has been illustrated in FIG. 1 as being separate from the video files 116, it is not limited thereto and may instead be at least partially embedded within the video files 116. The database 112 may also include user data 117 that will be described further below. The metadata 114 can identify the start and end locations of video segments and can identify visual/audible content of the respective video segments. For example, the metadata 114 may include labels that categorize/characterize the visual/audible content of at least some scenes contained in the video segments. The labels may identify the location of action scenes, comedy scenes, romantic scenes, nature scenes, content ratings (e.g., G-rating, PG-rating, PG-13-rating, R-rating, etc.), violence ratings, language ratings, etc. Moreover, the labels may further indicate a grading of scenes in the indicated category in order to convey, for example, how intense a scene is relative to a defined scale for the category and/or how much of the scene is related to the category (e.g., 30% of the scene has a violence rating of 4 points on a 5 point scale).

Figure 2:
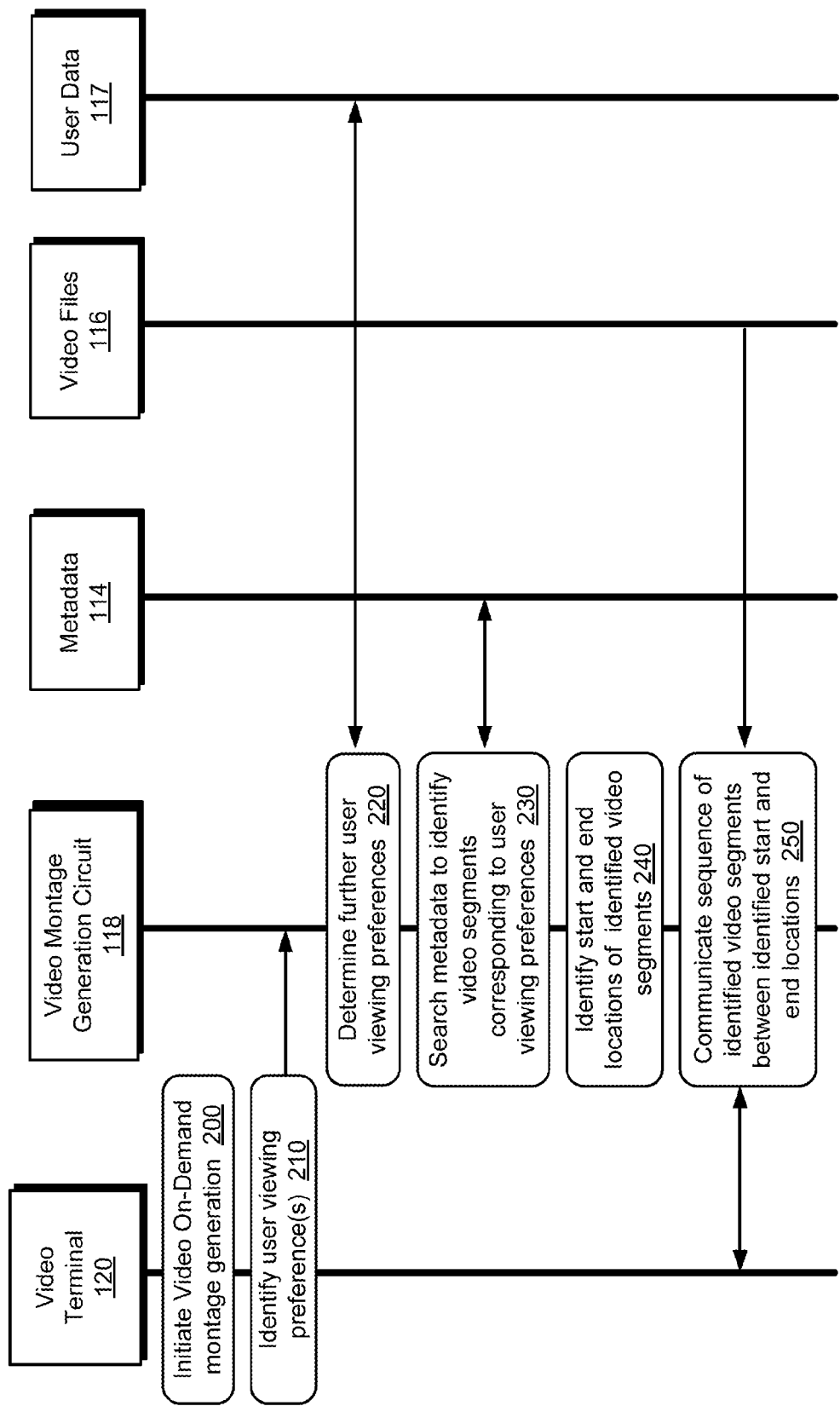
FIG. 2 is an example data flow diagram of exemplary operations and methods that may be carried out to generate a montage of video segments using components of the system of FIG. 1.

FIG. 2 is an example data flow diagram of exemplary operations and methods that may be carried out to generate a montage of video segments using components of the system of FIG. 1. Referring to FIG. 2, the video terminal 120 may initiate (block 200) the generation of a montage of available on-demand videos in response to, for example, a user tuning the terminal 120 tuning to receive a defined channel (e.g., a Barker channel) and/or responsive to another user selection. The user may identify (block 210) the user's viewing preferences by entering, such as by typing or selecting among displayed categories, the user's viewing preferences into the video terminal 120. The montage generation circuit 118 may, for example, communicate a menu of available categories, search terms, and/or other information for display on the video terminal 120 and which can be selected among by the user to indicate the user's preferences.

As will be explained in further detail below, the montage generation circuit 118 may determine (block 220) further user viewing preferences, such as the user's previous viewing habits and/or predefined viewing preferences which are identified by user data 117 within the database 112. The generation circuit 114 can then search (block 230) through the metadata 114 to identify video segments within one or more videos that correspond to the identified user viewing preferences, and can identify (block 240) the start and end locations of the identified view segments. The generation circuit 114 can then generate (block 250) the montage by communicating the sequence of identified video segments between the identified start and end locations to the video terminal 120.

Figure 3:
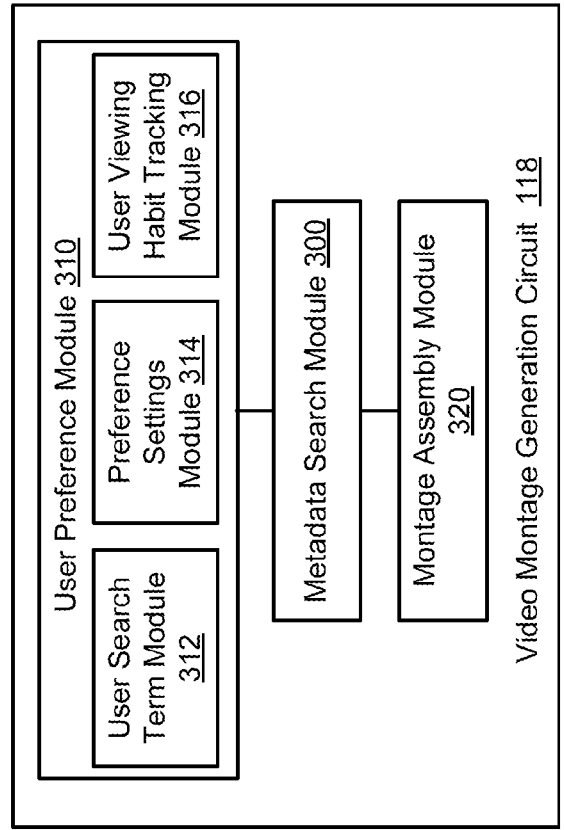
FIG. 3 is an example block diagram of the video montage generation circuit shown in FIG. 1.
Figure 7:
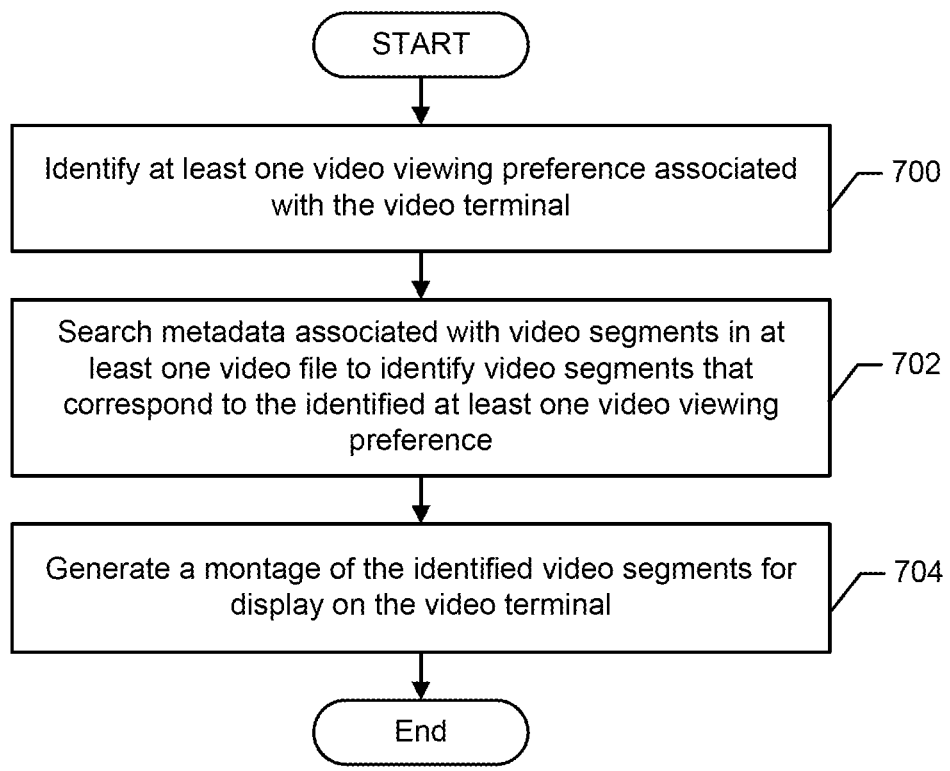
FIGS. 7-13 are flowcharts of example operations and methods that may be carried out by components of the system of FIG. 1 to generate montages of video segments.
Figure 8:
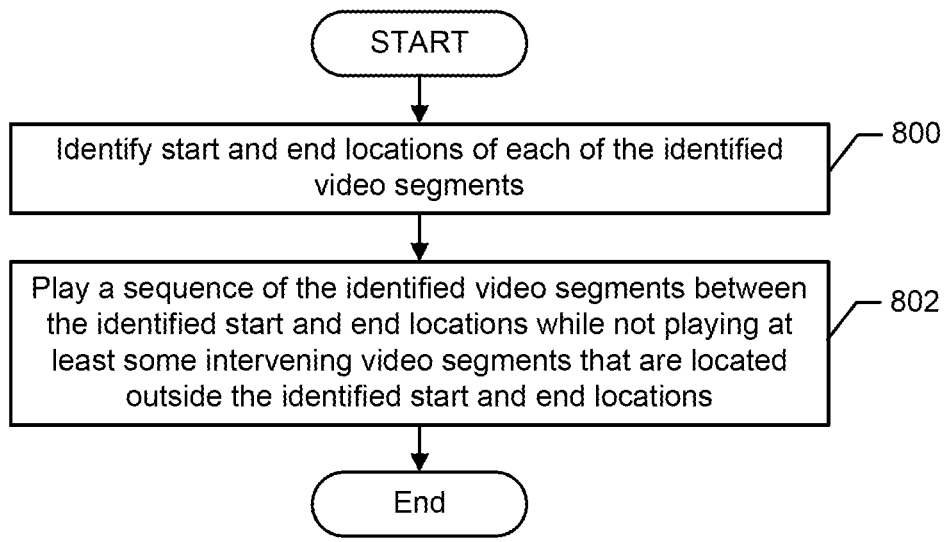

FIG. 3 is an example block diagram of the video montage generation circuit 118 shown in FIG. 1. FIG. 7 is a flowchart of example operations and methods that may be carried out to generate montages of video segments. Referring to FIGS. 3 and 7, the generation circuit 118 can include a user preference module 310, a metadata search module 300, and a montage assembly module 320. The user preference module 310 is configured to identify (block 700 of FIG. 7) at least one video viewing preference associated with the video terminal 120, and may carry out this identification in response to user generated search terms, in response to data that defines a user's viewing preferences, and/or in response to data that identifies a user's previous video segment viewing history. The metadata search module 300 is configured to search (block 702 of FIG. 7) metadata associated with video segments in at least one video file to identify video segments that correspond to the identified at least one video viewing preference. The montage assembly module 320 is configured to generate (block 704 of FIG. 7) a montage of the identified video segments for display by the video terminal.

Various further example operations and methods that may be carried out by the video montage generation circuit 118 will now be described with regard to the flowcharts of FIGS. 8-13.

The user preference module 310 may include a user search term module 312 that receives one or more search terms from a user who is operating the video terminal 120, such as by operating a user interface in the video terminal 120 that enables a user to type, select, or otherwise generate at least one search term that characterizes at least one content category that the user desires to see in video scenes (e.g., action scenes that display explosions, car chases, etc.). The module 312 may communicate a list of available categories, search terms, or other information for display on the video terminal 120 and selection by the user to generate one or more search terms. The user search term module 312 receives (block 1100 of FIG. 11) the user generated search term(s) from the video terminal 120, and forwards the search term(s) to the metadata search module 300.

The metadata search module 300 searches (block 1102 of FIG. 11) among labels in the metadata 114 (FIG. 1) that characterize the visual content of scenes, and identifies labels that match the one or more search terms. The search module 300 generates (block 1104 of FIG. 11) a list of the video segments that correspond to the identified labels in the metadata.

The montage assembly module 320 then generates a montage of the identified video segments which are communicated to the video terminal 120. The video terminal 120 may display the received montage on an integrated display device and/or on a separate display device that is communicatively connected to the video terminal 120, such as by a wireless local area network or other wireless connection. The montage assembly module 320 may generate the montage by playing (block 1106 of FIG. 11) a sequence of the listed video segments.

More particularly, the search module 300 may identify (block 800 of FIG. 8) start and end locations of each of the identified video segments. The montage assembly module 320 can then generate the montage by playing (block 802 of FIG. 8) a sequence of the identified video segments between the identified start and end locations while not playing at least some intervening video segments that are located outside the identified start and end locations.

Thus, for example, when a user tunes the video terminal 120 to a Barker channel, the video on-demand server 110 can prompt the user to enter search terms or otherwise receive user generated search terms, which are used to determine the user's viewing preference(s). The video on-demand server 110 can then communicate a montage of video segments through the Barker channel that matches those preferences. In this manner, the user can be presented with advertisements for movies that are determined by the server 110 to closely match the user's interest, and moreover the user can be presented with a selected subset of scenes from those movies that have particular characteristics of scenes that match the search terms identifying the user's viewing preference(s).

FIG. 4 is another example block diagram of the video on-demand server 110 and the database 112 of FIG. 1. The database 112 includes a plurality of video files 400 (video_1, video_2, ... video_N) and corresponding sets of metadata 410 (metadata_1, metadata_2, ... metadata_N). The metadata 410 may identify the start and end locations of video segments within each of the movies. The video segments may correspond to scenes that are uninterrupted and/or that have a defined type of visual/audible content. The montage generation circuit 118 can search (e.g., via the search module 300) through the metadata 410 to identify the starting and ending locations of video segments within the video files 400 that have labels containing information that correspond to the video viewing preference(s) associated with a user of the video terminal. The montage generation circuit 118 can then generate a montage 420 by sequentially playing the identified video segments between the identified start and end locations of the video files 400 while not playing at least some intervening video segments that are located outside the identified start and end locations. The montage can be communicated as streaming video and/or as encoded data to the video terminal 120.

Figure 5:
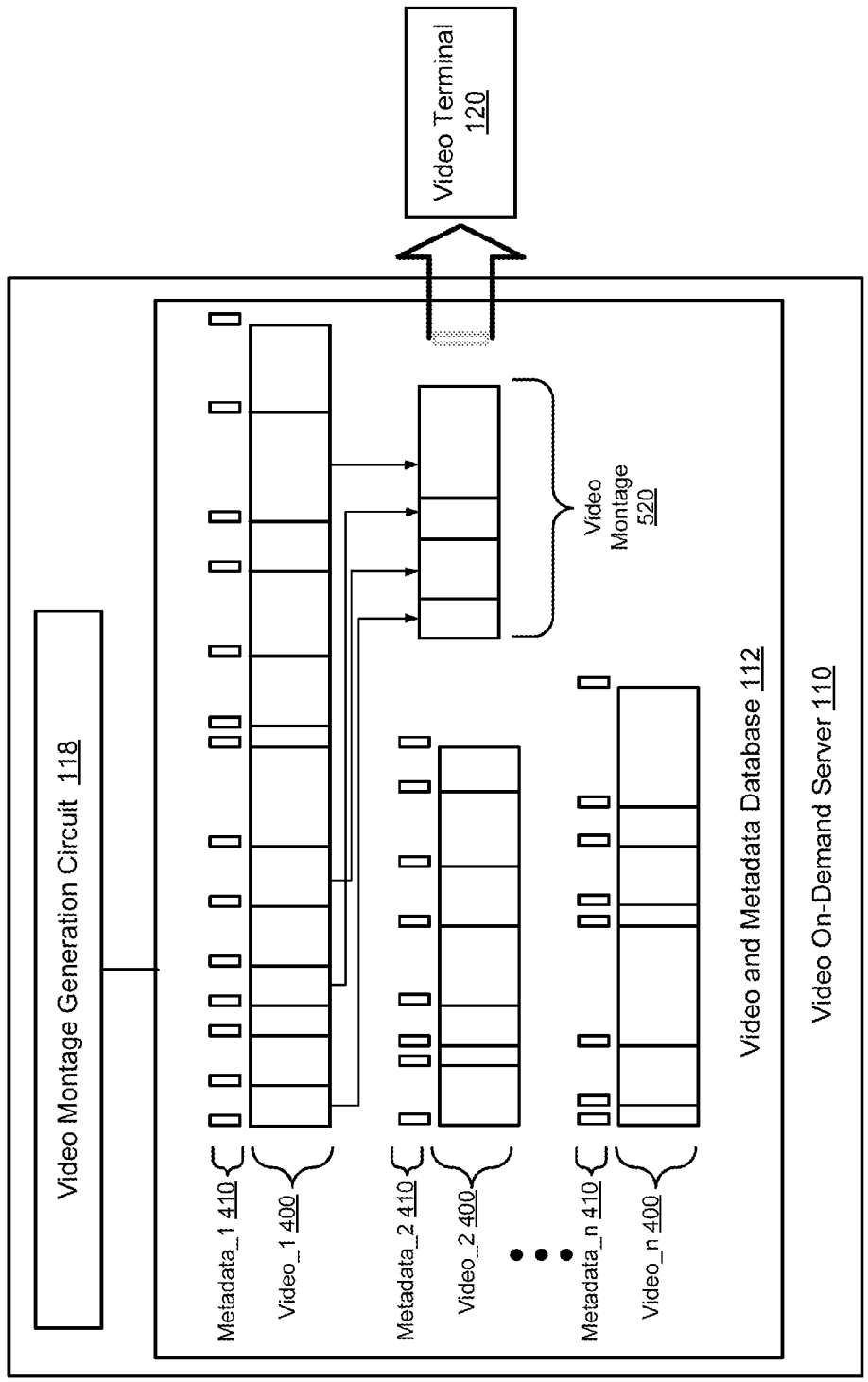
FIG. 5 is another example block diagram of the video on-demand server shown in FIG. 1 that generates a montage of video segments from a selected video file.

FIG. 5 is another example block diagram of the video on-demand server 110 and the database 112 of FIG. 1. In contrast to the block diagram of FIG. 4, the montage generation circuit 118 searches through the metadata 410 that is associated with a single one of the video files 400 to identify video segments that match the viewing preference(s), and generates a montage 520 from the identified video segments within the single video file 400. Accordingly, the montage may be assembled from video segments that are contained within a single movie, as shown in FIG. 5, or may be assembled from video segments within a plurality of movies, as shown in FIG. 4.

FIG. 6 is another example block diagram of the video on-demand server 110 shown in FIG. 1. The video on-demand server 110 can include memory device(s) 612, a processor circuit 600, and a network interface 620. The memory device(s) 612 may include a mass storage device, such as one or more disk drives and/or semiconductor memory, that contain a plurality of video files 116 and associated metadata 114, and may further include the user data 117. All or part of the database 112 may be omitted in some embodiments, such as when the video is received from another network device (e.g., from a separate media server). The processor circuit 600 may include one or more data processing circuits, such as a general purpose and/or special purpose processor (e.g., microprocessor and/or digital signal processor) with on-board and/or separate memory devices. The processor 600 is configured to execute computer program instructions in functional modules 610 within a memory, which is described below as a computer readable medium and which may reside within the memory device(s) 612, to operate as described herein. The network interface 620 is configured to communicate with the video terminal 120 through the network 130.

Figure 9:
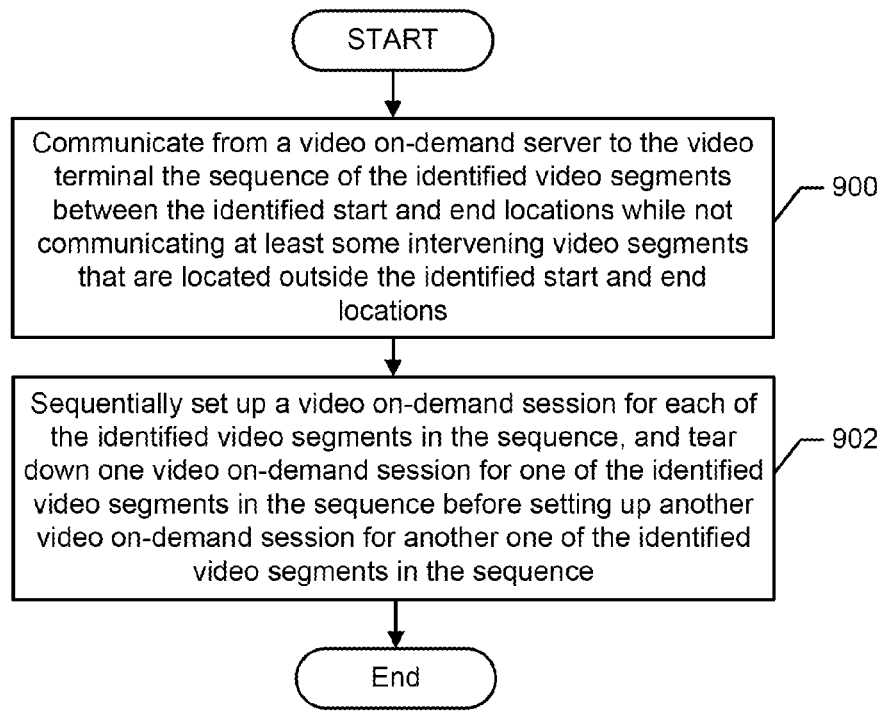

FIG. 9 shows further operations that may be carried out by the montage assembly module 320 to play a sequence of the identified video segments between the identified start and end locations while not playing at least some intervening video segments that are located outside the identified start and end locations. Referring to FIG. 9, the montage assembly module 320 communicates (block 900) from the video on-demand server 110 to the video terminal 120, via the network 130, the sequence of the identified video segments between identified start and end locations while not communicating at least some intervening video segments that are located outside the identified start and end locations. The montage assembly module 320 may sequentially set-up (block 902) a video on-demand session between the video on-demand server 110 and the video terminal 120 for the identified video segments in the sequence, and may tear down (block 902) one video on-demand session for one of the identified video segments in the sequence before setting up another video on-demand session for another one of the identified video segments in the sequence.

Figure 12:
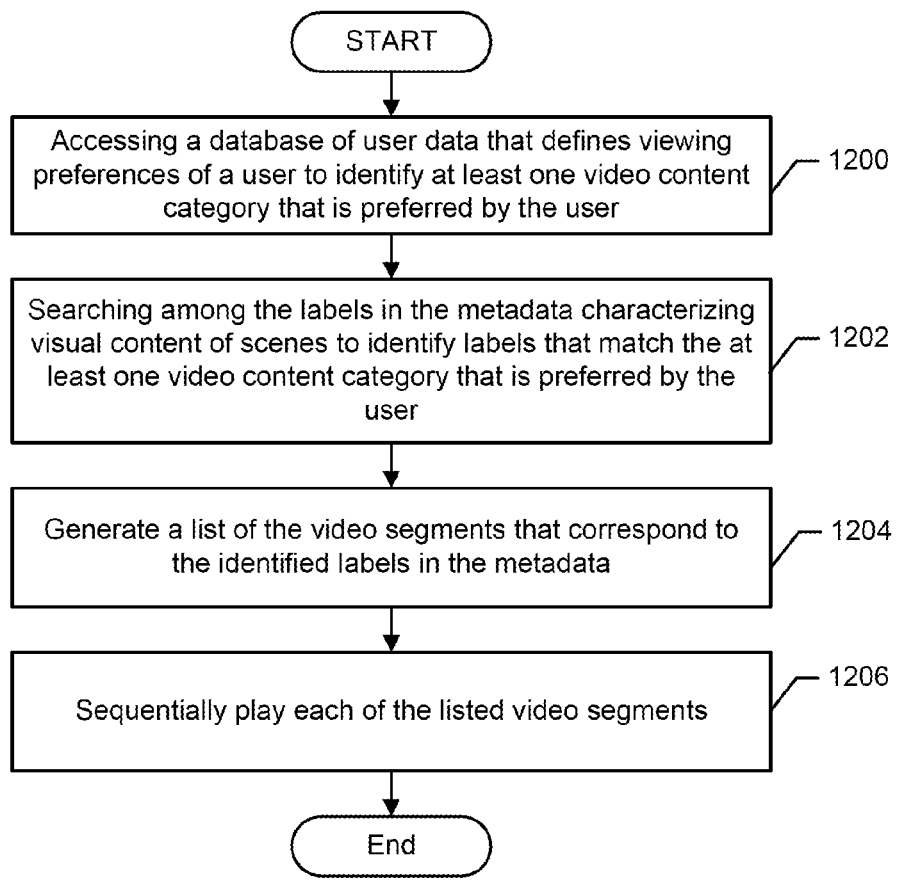

In some other embodiments, the user preference module 310 includes a preference settings module 314 that performs a database lookup to determine a user's viewing preferences. FIG. 12 is a flowchart of operations and methods that may be carried out by the preference settings module 314. Referring to FIG. 12, user data 117 within the database 112 is accessed (block 1200). The user data 117 defines the viewing preferences of a user. A user may define the viewing preferences by selecting, typing, or otherwise entering information, such as via a user interface of the terminal 120, that identifies at least one video content category that is preferred by the user. The content category may include, for example, action scenes, comedy scenes, romantic scenes, nature scenes, content ratings (e.g., G-rating, PG-rating, PG-13-rating, R-rating, etc.), violence ratings, language ratings, etc.

The preference settings module 314 uses the user data 117 to identify at least one video content category that is preferred by the user, and forwards the identified one or more video content categories to the metadata search module 300. The metadata search module 300 searches (block 1202) among the labels in the metadata 114 (FIG. 1) to identify labels that match the identified one or more video content categories. The search module 300 generates (block 1204) a list of the video segments that correspond to the identified labels in the metadata. The montage assembly module 320 then sequentially plays (block 1206) each of the listed video segments, with the resulting video stream and/or encoded data being communicated to the video terminal 120 for display. The metadata search module 300 and the montage assembly module 320 may further operate as described above with regard to FIGS. 2-11.

Thus, for example, when a user tunes the video terminal 120 to a Barker channel, the video on-demand server 110 can look-up the user's preferences, and can communicate a montage of video segments through the Barker channel that matches those preferences. In this manner, the user can be presented with advertisements for movies that are determined by the server 110 to closely match the user's interest, and moreover the user can be presented with a selected subset of scenes from those movies that have particular characteristic scenes that match the identified viewing preference(s) of the user. The server supplying the example Barker channel may be, but is not limited to, a cable video on-demand server, a terrestrial broadcast video on-demand server, an Internet video on-demand server, and/or a satellite broadcast video on-demand server.

Figure 13:
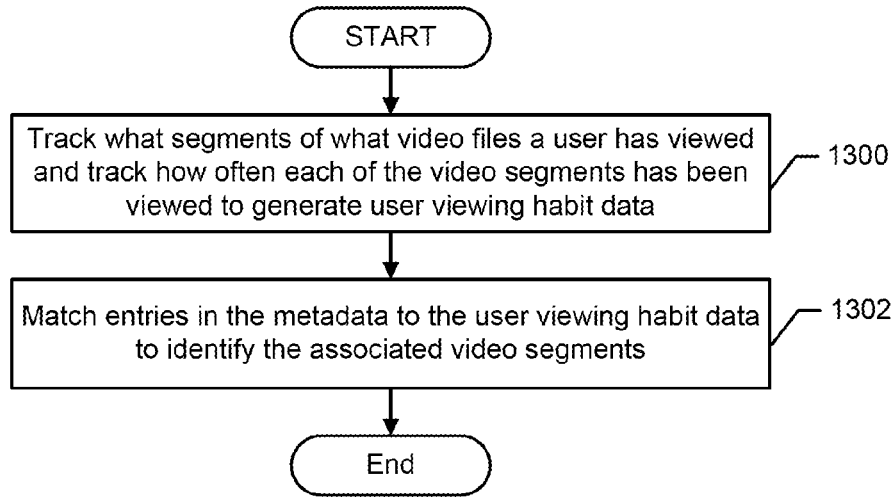

In some other embodiments, the user preference module 310 includes a tracking module 316 that tracks a user's video viewing habits. FIG. 13 is a flowchart of operations and methods that may be carried out by the tracking module 316. Referring to FIG. 13, tracking (block 1300) is performed to determine what segments within the video files 116 a user has viewed, and may further track how often each of the video segments have been viewed to generate data that characterize the user's video viewing habits. The tracking may generate user viewing habit data that identifies what video segments a user has viewed, how often each video segment has been viewed, which video segments were repeatedly viewed before viewing was allowed to proceed to a subsequent video segment, and/or what video segments were not viewed by fast forwarding through the video segments or jumping ahead in the video timeline past the video segments. The tracking module 316 may further identify characteristics of the identified video segments, such as the visual/audio content of those video segments, that are preferred by the user. The identity of the video segments and/or their identified characteristics may be stored in the database 112, such as within the user data 117. The tracking module 316 can subsequently retrieve the identified video segments and identified characteristics (e.g., number of times viewed, number of times skipped, etc) and provide the retrieved information as user viewing habit data to the metadata search module 300.

The metadata search module 300 searches (block 1302) through the metadata 114 to find entries that match the user viewing habit data and, thereby, identify associated video segments that are expected to be preferred by the user. For example, when a user has a habit (determined by the tracking module 316) of watching certain types of action scenes, the metadata search module 300 can search through the metadata 114 to select video segments that the user has shown a preference for watching. Alternatively, the metadata search module 200 may select video segments from movies that the user may not have previously viewed but which contain scenes that contain content that matches the user's observed interests.

For example, when a user has a habit (determined by the tracking module 316) of watching certain types of action scenes, the metadata search module 300 can search through the metadata 114 to select video segments that are indicated to contain those types of action scenes. The metadata search module 300 can generate the list of the identified video segments, and the montage assembly module 320 can sequentially play each of the listed video segments for communication to the video terminal 120 for viewing.

Thus, for example, when a user tunes the video terminal 120 to a Barker channel, the video on-demand server 110 can use the user's previous viewing habits to determine the user's viewing preferences, and can communicate a montage of video segments through the Barker channel that match those preferences. In this manner, the user can be presented with advertisements for movies that are determined by the server 110 to closely match the user's interest, and moreover the user can be presented with a selected subset of scenes from those movies that have particular characteristics that the user has demonstrated a preference for viewing.

Figure 14:
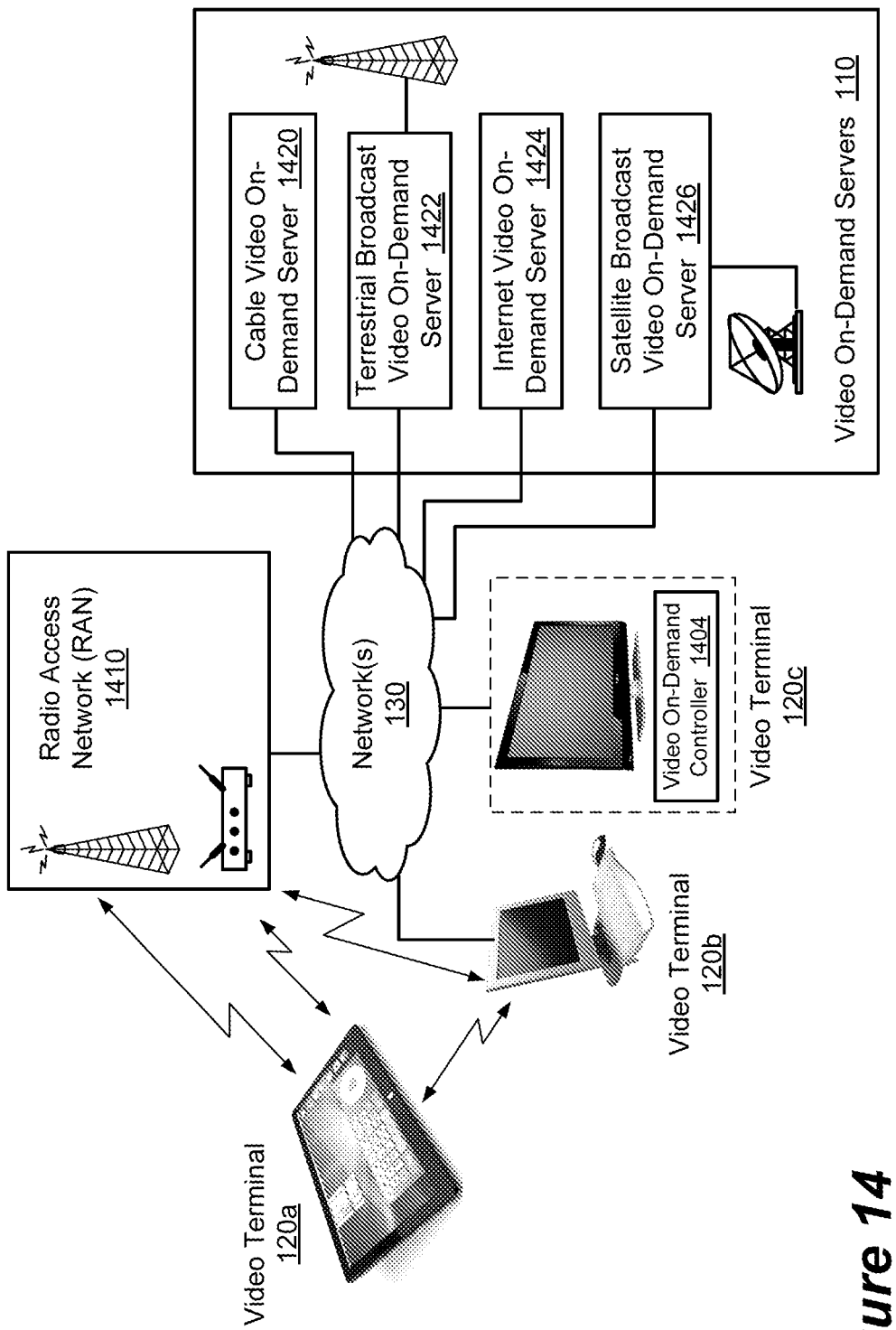
FIG. 14 is an example block diagram of a system that includes a plurality of video on-demand servers that generate a montage of video segments in response to video viewing preferences identified for various wireless and/or wired video terminals.

FIG. 14 is an example block diagram of a system that includes a plurality of wireless and/or wired video terminals 120a-c, a radio access network (RAN) 1410, and a plurality of media servers 110 that are configured according to some embodiments of the present invention. The RAN 1410 and the media servers 110 may include a terrestrial broadcast video on-demand server 1422 and/or a satellite broadcast video on-demand server 1426 that stream television programs or other video media through a terrestrial base station(s) or a satellite(s), respectively, to one or more of the video terminals 120a-c. Alternatively or additionally, the media servers 110 may correspond to a cable video on-demand server 1420 and/or an Internet video on-demand server 1422 that stream television programs or other video media through one or more networks 130 and/or the RAN 1410 to one or more of the electronic terminals 402a-c.

The electronic terminal 120a can be configured, for example, as a wireless communication terminal that communicates with at least some of the media servers 110 through the radio access network (RAN) 1410. The RAN 1410 may contain one or more cellular radio access technology systems that may include, but are not limited to, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), and/or 3GPP LTE ($3^{rd}$ Generation Partnership Project Long Term Evolution). The RAN 1410 may alternatively or additional communicate with the terminal 120a through a Wireless Local Area Network (i.e., IEEE 802.11) interface, a Bluetooth interface, and/or other RF interface.

As explained above, although some embodiments have been described in the context of the video terminal 120 receiving the montage of video segments which has been generated by the video on-demand server 110, the video terminal 120 is not limited thereto. The montage may alternatively or additionally be generated by the video terminal 120 as a stand-along device. Accordingly, some of the functionality that has been described herein as being carried out by the video on-demand server 110 may instead be incorporated in and carried out by components of the video terminal 120. The video terminal 120 may therefore be configured to identify at least one video viewing preference associated with a user, to search through metadata associated with video segments in at least one video file to identify video segments that correspond to the identified at least one video viewing preference, and to generate a montage of the identified video segments for display by the video terminal.

Figure 10:
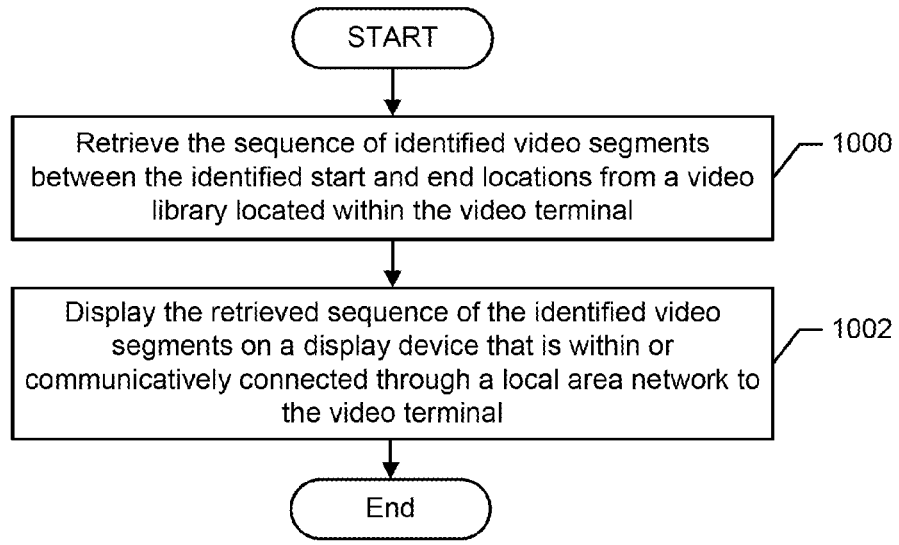
Figure 11:
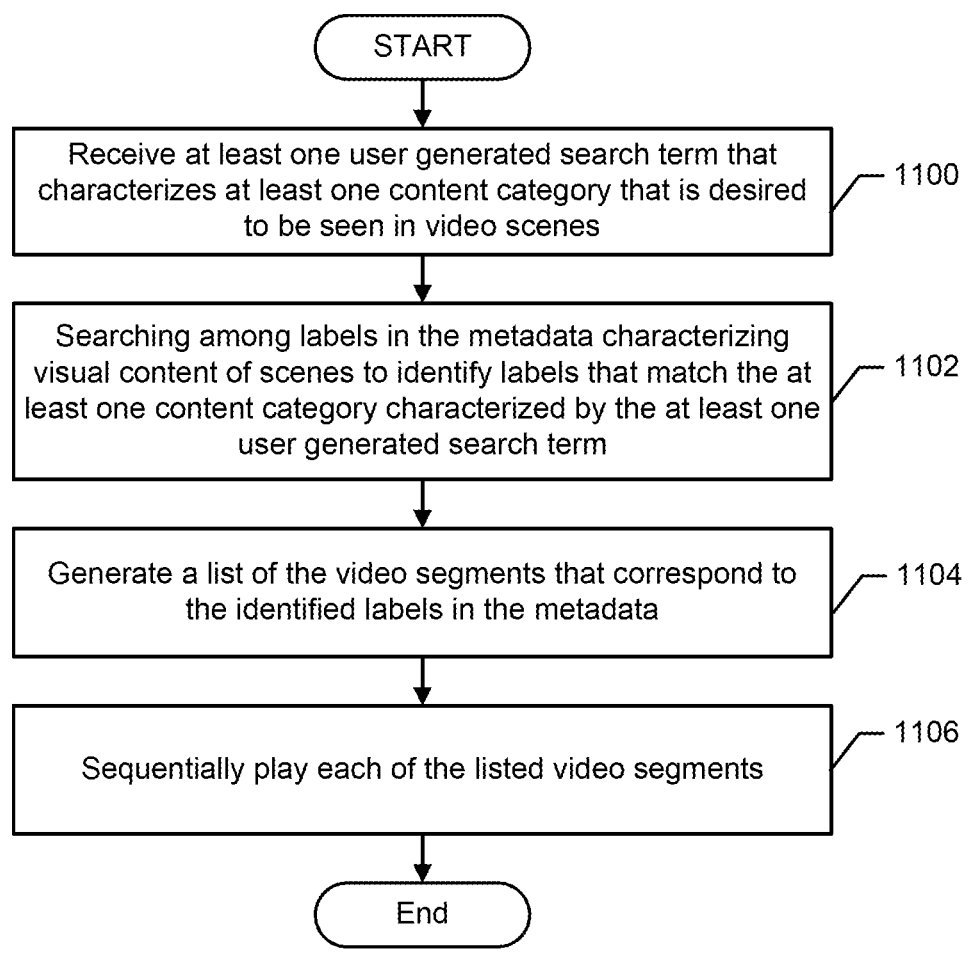

FIG. 10 is a flowchart of example operations and methods that may be carried out by components of the video terminal 120. Generation of the montage by the video terminal 120 can include retrieving (block 1000) the sequence of the identified video segments between the identified start and end locations from a video library (e.g., the database 112) located within the video terminal. The retrieved sequence of identified video segments can be displayed (block 1002) on a display device that is within the video terminal 120 or that is communicatively connected through a local area network or other wireless connection to the video terminal 120.

Figure 15:
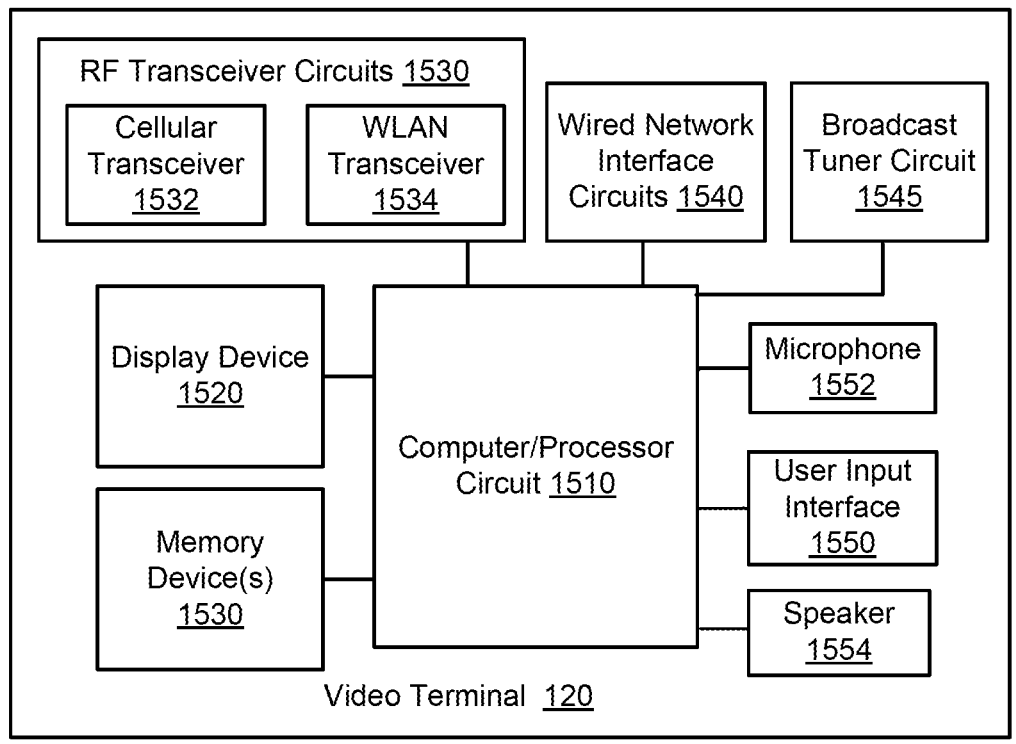
FIG. 15 is an example block diagram of a video terminal that can alone, or in combination with an external video server, generate a montage of video segments.

FIG. 15 is a block diagram of the video terminal 120 that is configured according to some embodiments of the present invention. The video terminal 120 can include a computer/processor circuit 1510, a display device 1520, and communication circuits, such as RF transceiver circuits 1530, wired network interface circuits 1540 (e.g., digital cable and/or digital subscriber line interface circuits), and/or a broadcast tuner circuit 1545. The RF transceiver circuits 1530 may include a cellular transceiver 1532 and/or a WLAN transceiver 1534 (i.e., IEEE 802.11). The cellular transceiver 1532 may operate according to a cellular radio access technology that may include, but is not limited to, GSM, GPRS, EDGE, DCS, PDC, PCS, CDMA, wideband-CDMA, CDMA2000, UMTS, and/or 3GPP LTE.

The RF transceiver circuits 1530 may be configured to receive a video stream from the media server 110 via the network(s) 130 and the RAN 1410 shown in FIG. 14. The wired network interface circuits 1540 may be configured to receive the media streams from the media server 110 through the network(s) 130. The tuner circuit 1545 be configured to be tunable to receive a channel being broadcast from the terrestrial broadcast video on-demand server 1422 and/or from the satellite broadcast video on-demand server 1426. The display device 1520 may be configured to display one or more video streams, such as by the methods and operations described herein. The computer/processor circuit 1510 may include one or more data processing circuits, such as a general purpose and/or special purpose processor (e.g., microprocessor and/or digital signal processor) with on-board and/or separate memory devices. The computer/processor circuit 1510 is configured to execute computer program instructions from a memory device(s) 1530, described below as a computer readable medium, to operate according to one or more embodiments disclosed herein for the video terminal 120. When the video terminal 120 is configured to generate the montage, the memory 1530 may include all or a portion of the database 112 described above.

The video terminal 120 may further include a microphone 1552, a user input interface 1550 (e.g., touch sensitive interface associate with the display device 1520, a keypad, a keyboard, buttons, joystick, or other apparatus configured to sense user inputted commands), and a speaker 1554 that can be configured to output any audio portion associated with one or more videos.

Figure 16:
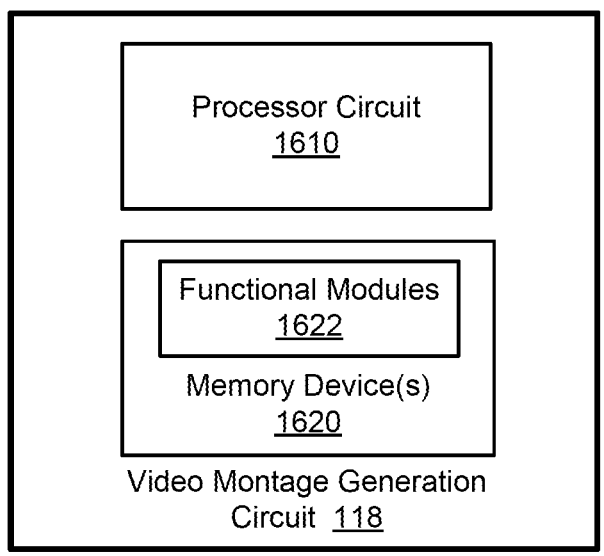
FIG. 16 is an example block diagram of a video montage generation circuit.

FIG. 16 is an example block diagram of the video montage generation circuit 118 that may reside within the video on-demand server 110 and/or within the video terminal 120. Referring to FIG. 16, the generation circuit 118 can include a processor circuit 1610 and memory device(s) 1620. The processor circuit 1610 may include one or more data processing circuits, such as a general purpose and/or special purpose processor (e.g., microprocessor and/or digital signal processor) with on-board and/or separate memory devices. The processor 1610 is configured to execute computer program instructions from functional modules, such as the functional modules shown in FIG. 3, residing in the memory device(s) 1620, described below as a computer readable medium, to carry out at least some of the operations disclosed herein for the generation circuit 118.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A computer-implemented method for generating a montage of video segments for display by a video terminal, the method comprising the steps of:
   identifying at least one video viewing preference associated with the video terminal;
   searching metadata associated with video segments in at least one video file to identify video segments that correspond to the identified at least one video viewing preference, wherein the step of searching metadata associated with video segments in at least one video file comprises the step of identifying start and end locations of each of the identified video segments; and generating a montage of the identified video segments for display by the video terminal, wherein
the step of generating the montage of the identified video segments comprises the step of playing a sequence of the identified video segments between the identified start and end locations while not playing at least some intervening video segments that are located outside the identified start and end locations, and
the step of playing the sequence of identified video segments between the identified start and end locations further comprises the step of communicating from a video on-demand server to the video terminal the sequence of the identified video segments between the identified start and end locations while not communicating at least some intervening video segments that are located outside the identified start and end locations.

2. The method of claim 1, wherein the step of communicating from a video on-demand server to the video terminal the sequence of the identified video segments between the identified start and end locations while not communicating at least some intervening video segments that are located outside the identified start and end locations comprises:
sequentially setting up a video on-demand session between the video on-demand server and the video terminal for the identified video segments in the sequence; and
tearing down one video on-demand session for one of the identified video segments in the sequence before setting up another video on-demand session for another one of the identified video segments in the sequence.

3. The method of claim 1, wherein:
the step of communicating from the video on-demand server to the video terminal comprises communicating from a cable video on-demand server, a terrestrial broadcast video on-demand server, an Internet video on-demand server, and/or a Satellite broadcast video on-demand server to the video terminal the sequence of the identified video segments between the identified start and end locations while not communicating at least some intervening video segments that are located outside the identified start and end locations.

4. The method of claim 1, wherein the step of playing a sequence of the identified video segments between the identified start and end locations further comprises the steps of:
retrieving the sequence of the identified video segments between the identified start and end locations from a video library located within the video terminal; and
displaying the retrieved sequence of identified video segments between the identified start and end locations on a display device that is within or communicatively connected through a local area network to the video terminal.

5. The method of claim 1, wherein:
the step of identifying at least one video viewing preference comprises receiving at least one user generated search term that characterizes at least one content category that is desired to be seen in video scenes; and
the step of searching metadata associated with video segments in at least one video file comprises identifying video segments that have associated metadata that identifies content of the respective video segments that matches the content characterized by the at least one user generated search term.

6. The method of claim 5, wherein:
the metadata includes labels that categorize visual content of at least some scenes contained in the video segments;
the step of searching metadata associated with video segments in at least one video file comprises:
searching among the labels in the metadata to identify labels that match the at least one content category characterized by the at least one user generated search term; and
generating a list of the video segments that correspond to the identified labels in the metadata; and
the step of generating a montage of the identified video segments for display by the video terminal comprises the step of sequentially playing each of the listed video segments.

7. The method of claim 1, wherein:
the metadata includes labels that categorize visual content of at least some scenes contained in the video segments;
the step of identifying at least one video viewing preference comprises accessing a database of user data that defines viewing preferences of a user to identify at least one video content category that is preferred by the user;
the step of searching metadata associated with video segments in at least one video file comprises:
searching among the labels in the metadata to identify labels that match the at least one video content category that is preferred by the user; and
generating a list of the video segments that correspond to the identified labels in the metadata; and
the step of generating a montage of the identified video segments for display by the video terminal comprises the step of sequentially playing each of the listed video segments.

8. The method of claim 1, wherein:
the step of identifying at least one video viewing preference comprises tracking what segments of what video files a user has viewed and further tracking how often each of the video segments has been viewed to generate user viewing habit data; and
the step of searching metadata associated with video segments in at least one video file comprises matching entries in the metadata to the user viewing habit data to identify the associated video segments.

9. A video montage generation circuit comprising:
a user preference module that is configured to identify at least one video viewing preference associated with a video terminal;
a metadata search module that is configured to search metadata associated with video segments in at least one video file to identify video segments that correspond to the identified at least one video viewing preference, the metadata search module is further configured to identify start and end locations of each of the identified video segments;
a montage assembly module that is configured to generate a montage of the identified video segments for display by the video terminal, wherein
the montage assembly module is further configured to play a sequence of the identified video segments between the identified start and end locations while not playing at least some of intervening video segments that are located outside the identified start and end locations;
wherein the video montage generation module resides in a video on-demand server; and
a video montage control module that is configured to communicate from the video on-demand server to the video terminal the sequence of the identified video segments between the identified start and end locations while not communicating at least some intervening video segments that are located outside the identified start and end locations.

10. The video montage generation circuit of claim 9, wherein:
the video montage control module is further configured to:
sequentially setup a video on-demand session between the video on-demand server and the video terminal for each of the identified video segments in the sequence; and
tear down one video on-demand session for one of the identified video segments in the sequence before setting up another video on-demand session for another one of the identified video segments in the sequence.

11. The video montage generation circuit of claim 9, wherein:
the video montage generation module resides in a cable video on-demand server, a terrestrial broadcast video on-demand server, an Internet video on-demand server, and/or a Satellite broadcast video on-demand server.

12. The video montage generation circuit of claim 9, wherein:
the video montage generation module resides in the video terminal; and
the montage assembly module is further configured to:
retrieve the sequence of the identified video segments between the identified start and end locations from a video library located within the video terminal; and
display the retrieved sequence of the identified video segments between the identified start and end locations on a display device that is within or communicatively connected through a local area network to the video terminal.

13. The video montage generation circuit of claim 9, wherein:
the metadata includes labels that categorize visual content of at least some scenes contained in the video segments;
the user preference module is further configured to receive at least one user generated search term that characterizes at least one content category that is desired to be seen in video scenes;
the metadata search module is further configured to:
search among the labels in the metadata to identify labels that match the at least one content category characterized by the at least one user generated search term; and
generate a list of the video segments that correspond to the identified labels in the metadata; and
the montage assembly module is further configured to sequentially play each of the listed video segments.

14. The video montage generation circuit of claim 9, wherein:
the metadata includes labels that categorize visual content of at least some scenes contained in the video segments;
the user preference module is further configured to access a database of user data that defines viewing preferences of a user to identify at least one video content category that is preferred by the user;
the metadata search module is further configured to:
search among the labels in the metadata to identify labels that match the at least one video content category that is preferred by the user; and
generate a list of the video segments that correspond to the identified labels in the metadata; and
the montage assembly module is further configured to sequentially play each of the listed video segments.

15. The video montage generation circuit of claim 9, wherein:
the user preference module is further configured to track what segments of what video files a user has viewed and to further track how often each of the video segments has been viewed to generate user viewing habit data; and
the metadata search module is further configured to match entries in the metadata to the user viewing habit data to identify the associated video segments.

* * * * *